Feb. 23, 1965     H. E. TEMPLE     3,170,581
DEPANNING APPARATUS
Filed Feb. 23, 1962     7 Sheets-Sheet 1

INVENTOR.
HIRAM E. TEMPLE
BY
ATTORNEYS

INVENTOR.
HIRAM E. TEMPLE

Feb. 23, 1965     H. E. TEMPLE     3,170,581
DEPANNING APPARATUS
Filed Feb. 23, 1962     7 Sheets-Sheet 3

INVENTOR.
HIRAM E. TEMPLE
BY
*Fearman, Fearman, & McCallum*
ATTORNEYS

Feb. 23, 1965    H. E. TEMPLE    3,170,581
DEPANNING APPARATUS
Filed Feb. 23, 1962    7 Sheets-Sheet 4

INVENTOR.
HIRAM E. TEMPLE
BY
ATTORNEYS

Feb. 23, 1965 H. E. TEMPLE 3,170,581
DEPANNING APPARATUS
Filed Feb. 23, 1962 7 Sheets-Sheet 5

INVENTOR.
HIRAM E. TEMPLE
BY
ATTORNEYS

Feb. 23, 1965   H. E. TEMPLE   3,170,581
DEPANNING APPARATUS
Filed Feb. 23, 1962   7 Sheets-Sheet 6
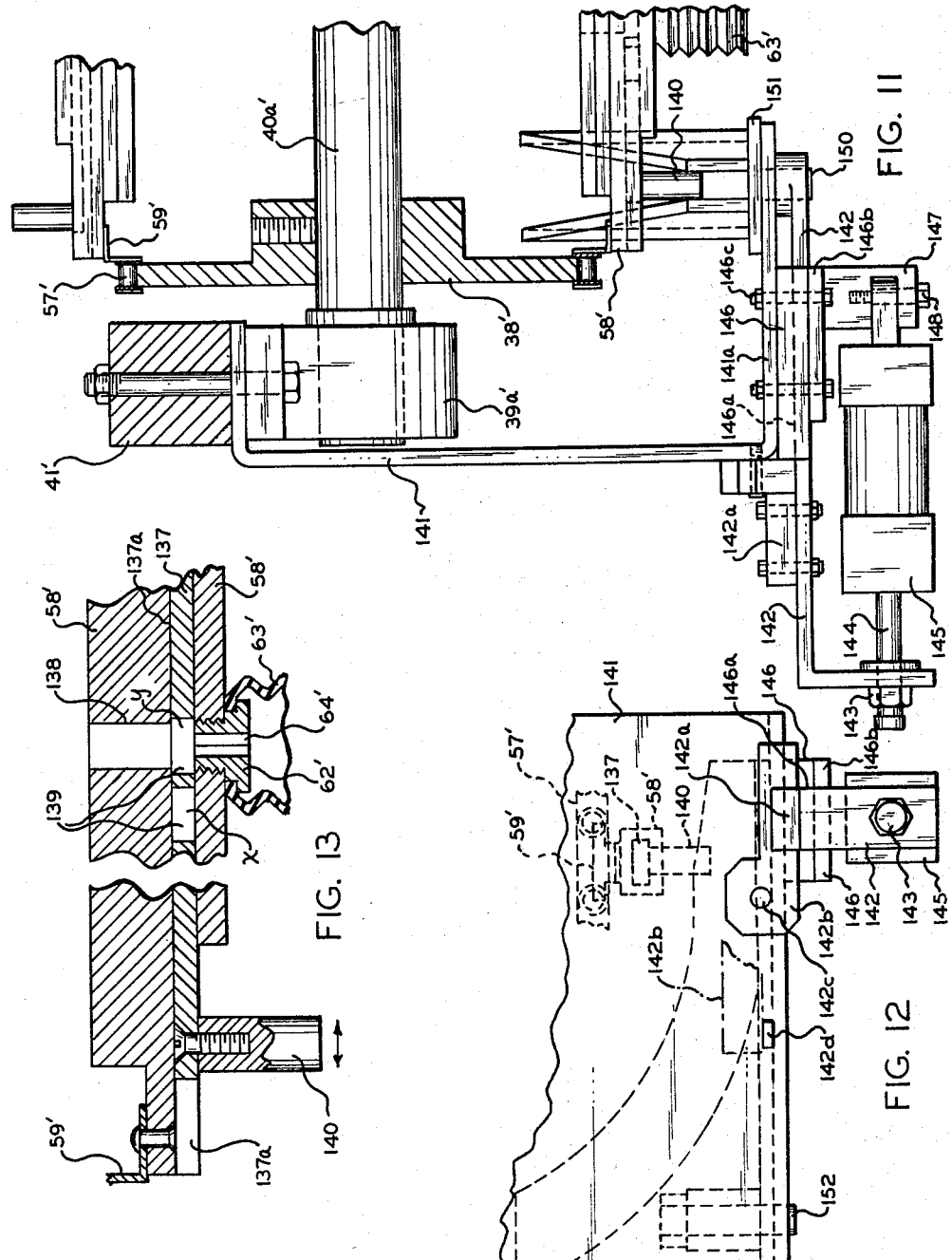
INVENTOR.
HIRAM E. TEMPLE
BY
ATTORNEYS Feb. 23, 1965    H. E. TEMPLE    3,170,581
DEPANNING APPARATUS
Filed Feb. 23, 1962    7 Sheets-Sheet 7

INVENTOR.
HIRAM E. TEMPLE
BY
ATTORNEYS

United States Patent Office 3,170,581
Patented Feb. 23, 1965

3,170,581
DEPANNING APPARATUS
Hiram E. Temple, Saginaw, Mich., assignor to Baker Perkins Inc., Saginaw, Mich., a corporation of New York
Filed Feb. 23, 1962, Ser. No. 175,035
14 Claims. (Cl. 214—309)

This invention relates to bakery handling apparatus and more particularly to depanning machines employing suction as a primary force to lift bakery products such as bread loaves from pans in which they have been baked, as the pans proceed continuously through the machine. The machines illustrated are designed particularly for the removal of bread loaves which are somewhat heavy in relation to buns, for example, and present a very uneven, irregular upper surface which would seem unadaptable to a continuous suction removal process.

One of the prime objects of the invention is to provide continuous depanning apparatus which operates rapidly and smoothly and does not damage the pans or product as do impact depanning machines of various designs presently on the market.

Another object of the invention is to provide depanning apparatus of the character mentioned utilizing product contacting bellows suction members which are configured to provide maximum three-dimensional flexibility and to permit sealing to the irregular upper surfaces of bread loaves and other bakery products.

A further object of the invention is to provide a depanning machine which can depan seed bread without dislodging the seeds on the bread surface.

A further object of the invention is to provide a depanning machine in which pan sets proceeding through the machine can selectively activate the suction members or certain suction members so that only those suction members in rows which engage the bread communicate with the suction source.

Another object of the invention is to provide a machine employing bellows type suction members which are particularly designed for contacting and sealing to the upper surfaces of bread loaves and other irregularly surfaced bakery products and have proven highly reliable and efficient for that purpose.

A still further object of the invention is to provide a highly practical machine in which the suction members are readily replaceable and which can be relatively economically manufactured and sold.

Other objects and advantages of the invention will be pointed out specifically or will become apparent from the following description when it is considered in conjunction with the appended claims and the accompanying drawings, in which:

FIGURE 11 is a fragmentary, enlarged, transverse, sectional view illustrating mechanism for actuating shifter valve members which are employed in this embodiment of the invention;

FIGURE 12 is a side elevational view depicting certain parts of this mechanism;

FIGURE 13 is a transverse, sectional view more clearly illustrating the shifter valve parts;

Figure 1:
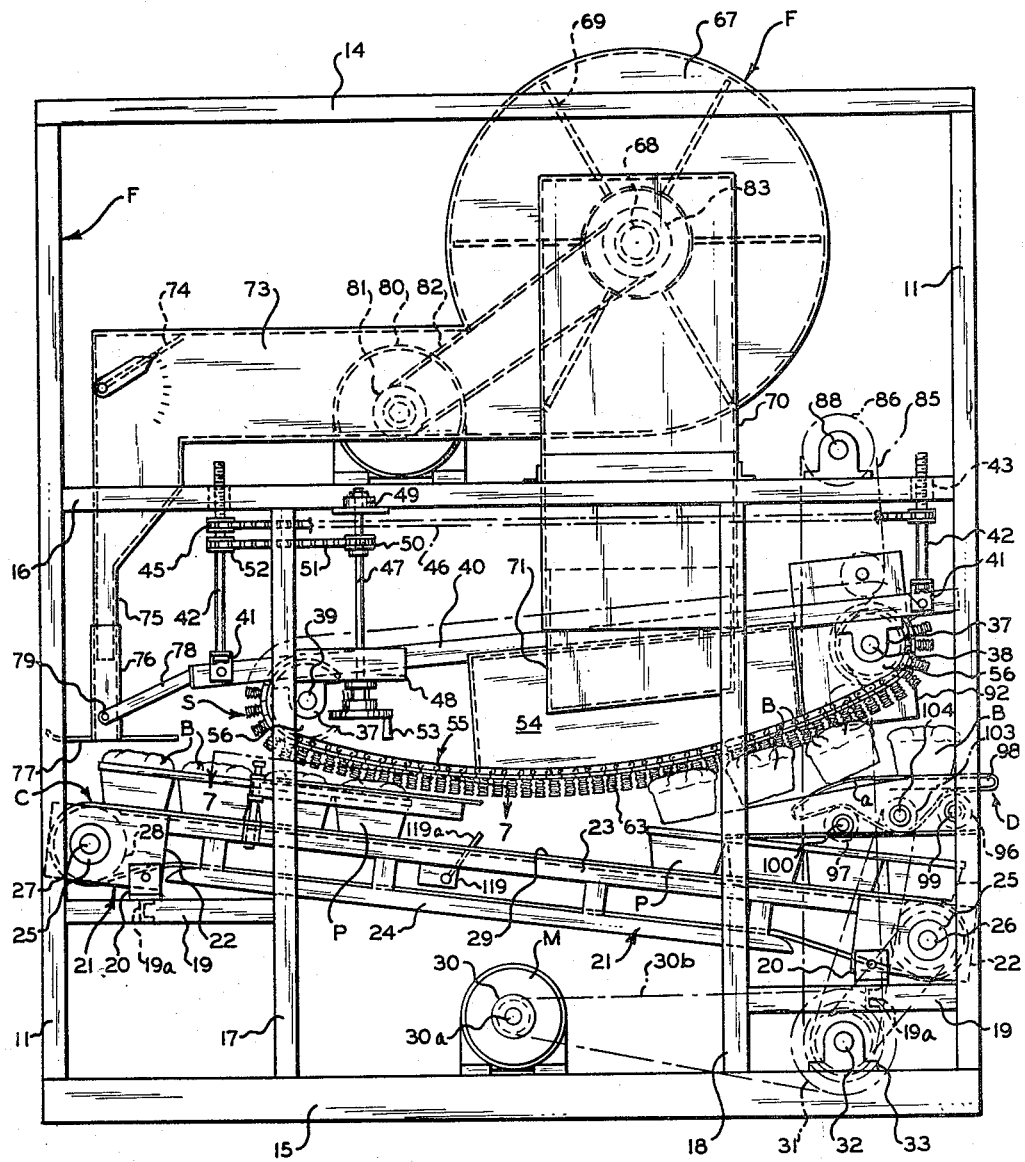
FIGURE 1 is a somewhat schematic side elevational view illustrating a depanning machine in which the pan sets are moved longitudinally to and through the machine.

Referring now more particularly to the accompanying drawings in which are shown preferred embodiments of the invention and, in the first instance, to FIGURES 1–8A, a letter F generally illustrates supporting framework for the machine which can take any desired form and, as shown, includes spaced front end rail members 11 (FIGURE 2) connected by top and bottom rails 12 and 13. The framework at the rear of the machine includes similar members and it will be seen that upper and lower longitudinal rail members 14 and 15 connect the front and the rear end rail members 11 at both sides of the framework F. Longitudinal brace members 16 connecting the front and rear vertical members 11 are provided along both sides of the framework and vertical members 17 and 18 function to brace the longitudinal rails 16.

Broadly, the machine comprises a generally longitudinally disposed pan set conveyor, generally designated C, and an overhead suction applying conveyor, generally designated S, which functions to remove the loaves of bread B from the pan sets P to a discharge conveyor member generally designated D. Mounted between vertical members 11 and 17, and 11 and 18, are members 19 which support transversely disposed cross members 19a. The latter members mount angle members 20 which support the ends of the conveyor C frame generally designated 21, the frame 21 including spaced apart end plates 22 connected by upper run supporting rails 23 which support dependent lower run supporting guides 24. Provided on the front and rear plates 22 are bearings 25 for supporting front and rear shafts 26 and 27, respectively, which mount pairs of sprocket members 28 and a pair of endless conveyor members 29. The endless members 29 may comprise a series of hingedly connected plates of the type shown in Patent No. 1,966,659. The conveyor C is driven by a motor M having an output shaft 30 mounting a sprocket 30a over which is trained an endless chain 30b leading to a sprocket 31 on a jack shaft 32 journaled by bearings 33. As shown particularly in FIGURE 2, sprocket 34 on the shaft 32 drives the conveyor shaft 26 through a chain 35 which is trained around a sprocket 36 mounted on the one end of shaft 26.

Figure 2:
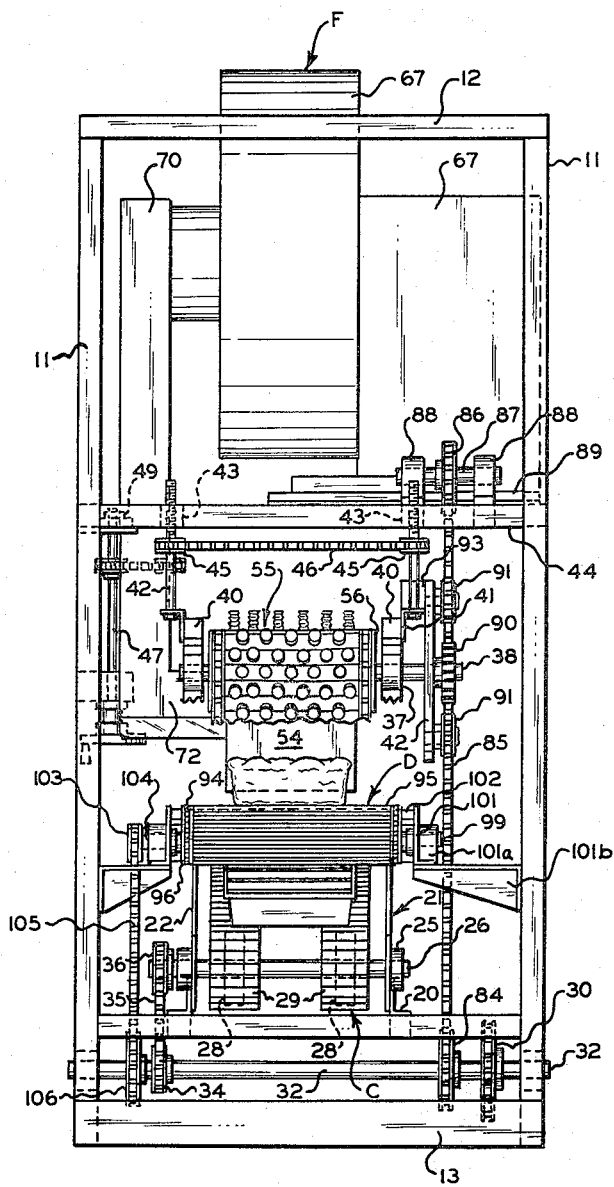
FIGURE 2 is a somewhat schematic front end elevational view thereof.
Figure 4:
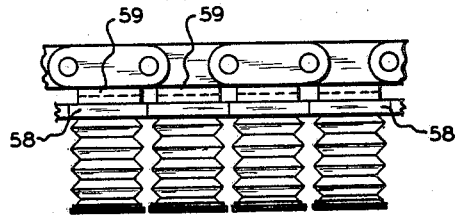
FIGURE 4 is a side elevational view thereof.

As indicated in FIGURES 1 and 2 particularly, the suction conveyor S is supported similarly by the framework F but in a manner such that it can be raised and lowered relative to the conveyor C. The bearings 37 which support the conveyor S front and rear shafts 38 and 39 depend from longitudinally extending, transversely spaced, upwardly inclining rails 40 which are themselves supported by straps 41 depending from rotatable shafts 42 which thread in nut members 43 carried by longitudinal cross members 44. Fixed on each shaft 43 are sprockets 45, as shown, and a chain 46 is trained around the sprockets 45. Adjusting shaft 47, journaled at its lower end by a block 48 and at its upper end by a bearing 49, has a sprocket 50 thereon connecting by means of a chain 51 with a sprocket 52 on the one rear support shaft 42 so that, upon rotation of shaft 47 by means of its handle 53, each of shafts 43 will be rotated through chain 46 to raise or lower the suction conveyor S as a unit. A travel range of three to four inches is desirable.

It is to be observed that the lower run of the suction conveyor S conforms closely to the curvilinear lower edges of a vacuum box 54, which, except for a duct communicating it with a suction fan, is open at its bottom only. The conveyor S endless belt, generally designated 55, which is trained around pairs of transversely spaced apart sprockets 56 on shafts 38 and 39, respectively, comprises a unitary structure (FIGURES 3 and 4) including side roller chains 57 which are trained over the sprockets 56, side-by-side suction member supporting bars 58, and angle plates 59 which join the ends of bars 58 to the inner connecting links 60 of the conventional roller chains 57.

Figure 3:
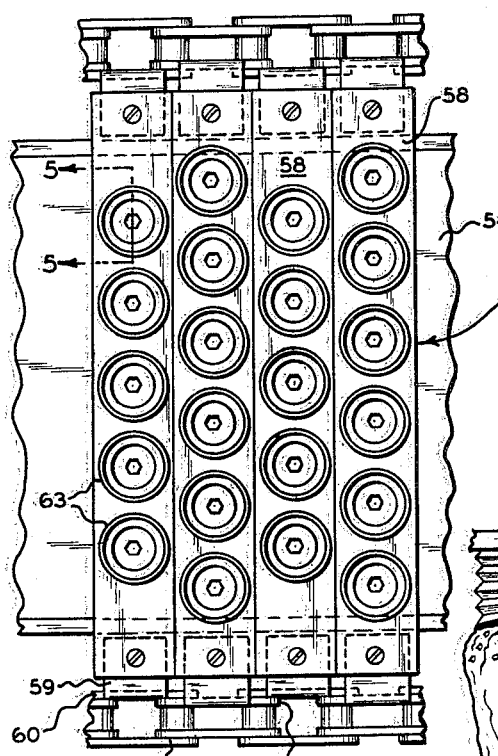
FIGURE 3 is a fragmentary, enlarged, inverse plan view of a section of the suction applying, endless belt assembly.
Figure 5:
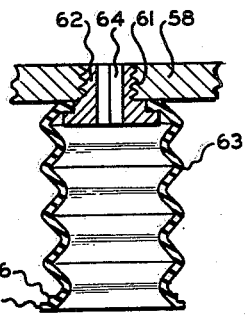
FIGURE 5 is a still further enlarged view taken on the line 5—5 of FIGURE 3 and illustrating the construction of one of the suction members.
Figure 6:
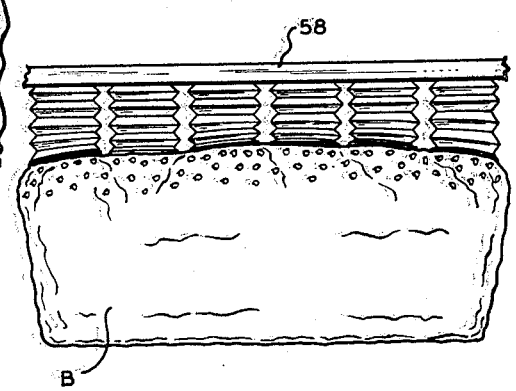
FIGURE 6 is a side elevational view indicating the manner in which the suction members grip a typical loaf of seed bread.
Figure 8A:
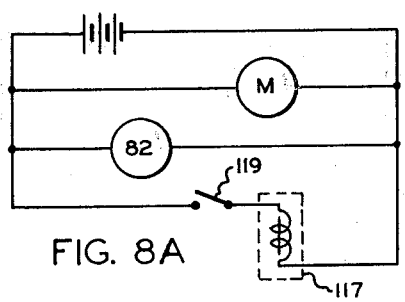
FIGURE 8A depicts a typical electrical control circuit which may be employed.

Each bar or plate 58 is provided with a number of threaded openings as at 61 (FIGURE 5) to receive threaded members 62 which mount the resilient, bread loaf engaging suction members 63. The members 62 include bores 64, which open the plates 58 to the suction box 54 and are so configured as to receive a hexagonal wrench. The configuration and construction of the tubular suction bellows members 63 which, as shown in FIGURE 3, are staggered in adjacent rows, is critical to the operation of the machine. The members must seal to the irregular configuration of the top surface of the bread without dislodging sesame seeds and the like, where the bread is of the so-called seed variety, and it was only by virtue of considerable experimentation that the present, readily compressible, three-dimensionally displaceable bellows members were evolved. As shown in FIGURE 5, the wall thickness of the bellows members 63 is substantially uniform, and the folds of the bellows are of uniform diameter and height except that the lowermost fold portion forms part of a sealing lip which also includes a substantially horizontally extending lip edge 65 which permits a snug seal to be achieved on the undulating surface of the top of the bread loaf. Molded integrally at the juncture of the lip edge 65 with the remaining portion of the lip of each bellows member 63 is a bead 66 which prevents the folding in or rolling under of edge 65 in a manner which would prevent achievement of a snug seal. In order to obtain the desired results it has been determined that the resilience of the bellows is critical. The lip edge 65 must be relatively soft as distinguished from stiff so that it does not dislodge seeds and will deform to accommodate to the seeds to achieve a snug seal. The rubber should be of a type having a durometer range from 40 to 55 and the wall thickness of the members should be in the range .020 to 1/16 of an inch.

The suction box 54, which is supported by the suction conveyor endless belt member 55 so that it can move upwardly and downwardly with it, is in communication with a conventional suction fan generally designed F (FIGURE 1) which includes a fan blade housing structure 67 mounting a shaft 68 with fan blades 69. A Spencer single stage turbo compressor fan Model #1520–1AD may be employed. Connected with the suction side of the housing 67 is a duct 70 which includes a telescopically received lower section 71 having a horizontal connection 72 to the suction box 54. Tube 70a connects the duct 70 to the fan housing 67. The fan assembly F may also include a duct 73, leading from the blower side of the fan housing 67, which includes a damper 74. At the lower end of duct 73 is a reduced boot section 75 telescopically receiving a member 76 having a shoe 77 on its lower end. The shoe 77 is supported by a link 78 pivotally connected to the section 76, as at 79, and secured at its opposite end to one member 40 so that it is movable upwardly and downwardly with the suction conveyor S. The purpose of this structure is to deliver a blast of air to the upper surface of the loaf to loosen it in its pan so that it may be more readily removed by the suction conveyor S. As will later appear, the shoe 77 must be supplemented with other means to assist the removal of the bread from the pans and is not by itself capable of performing the task of fully loosening the bread loaves in their pans.

The shaft 68 on which the blades 69 are mounted may be driven from a motor 80 mounting a sprocket 81. A chain 82 trained around sprocket 81 leads to a sprocket 83 on the fan shaft 68.

The conveyor shaft 38 can be driven from the jack shaft 32 through a sprocket 84 (FIGURE 2) and chain 85 which extends to a sprocket 86 on a shaft 87 supported in bearings 88 on a platform 89. The chain 85 passes around a sprocket 90 on shaft 38 and is maintained in driving engagement with shaft 38 by idler sprockets 91 carried by a plate 92 which is carried by a block 93 on one of the shafts 42 to move upwardly and downwardly with the suction conveyor S.

Interposed between the conveyors S and C which diverge at the front end of the machine, as shown, is the bread receiving conveyor D, which preferably is of the conventional slat type, wherein a pair of endless chains 94 are spanned by spaced apart rod members 95 to form a continuous endless conveyor member. The chains 94 are engaged by transversely spaced apart idler sprockets 96 at their front ends and spaced apart idler sprockets 97 rearwardly thereof, and are trained around elongate guides 98. The sprockets 96 are mounted on a shaft 99 and the sprockets 97 on a shaft 100. Brackets 101 supported from plates 101b have bearings journaling the shafts 99 and 100 and also include lugs 102 supporting the elongate guides 98 which have rear portions inclined upwardly, as shown, in the direction of extent of the lower run of the suction conveyor S to follow the course thereof. The upper run of the conveyor D is so spaced from the dependent bellows members 63 at $a$ at the front portion of the upwardly inclined portions of conveyor D that the bellows members 63 are compressed and there is a gripping of each loaf between the conveyor rods 95 and the bellows member 63 at the discharge position $a$ which accomplishes a uniform transfer of the bread loaves B to the horizontal portion of the upper run of conveyor D. In other words, the normal spacing between the lower ends of bellows members 63 and the rods 95 at the area $a$ is less than the normal height of the bread product being processed and this gripping pressure is important to a uniform release of the bread loaves B to the discharge conveyor D in positions in which they lie transversely to the direction of travel of conveyor D, rather than skewed thereto. A drive sprocket 103 mounted on a shaft 104 which is suitably journaled in bearings 101a on the brackets 101 drives the conveyor chains 94 through a chain 105 trained around a drive sprocket 106 on jack shaft 32.

Figure 7:
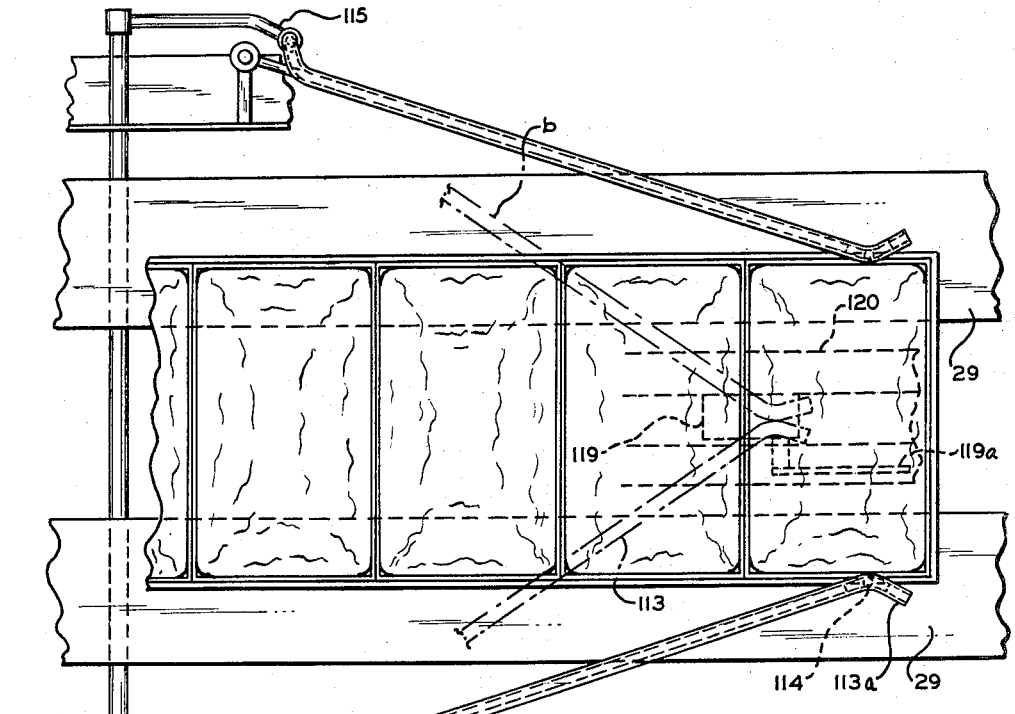
FIGURE 7 is a fragmentary, enlarged, top plan view taken on the line 7—7 of FIGURE 1 and indicating the manner in which air jet members are employed to assist the suction members in removing the bread from the pans, the diagrammatic lines indicating the normal inoperative position of the air jet tubes.
Figure 8:
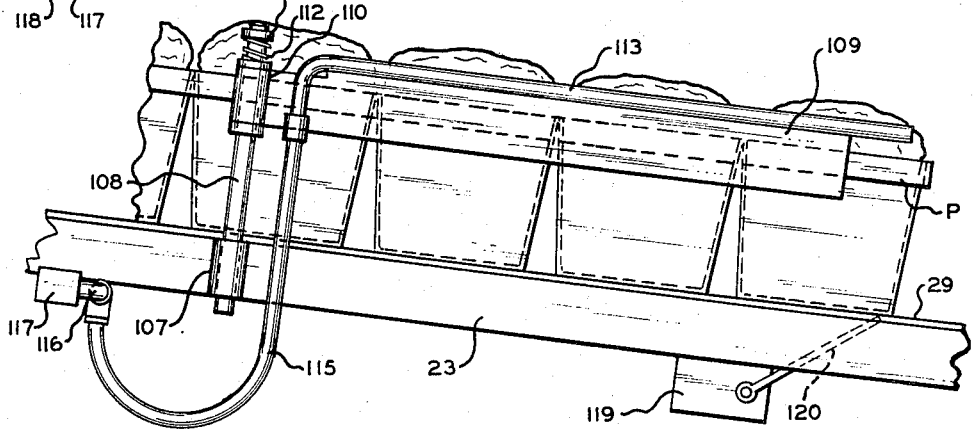
FIGURE 8 is a side elevational view thereof.
Figure 10:
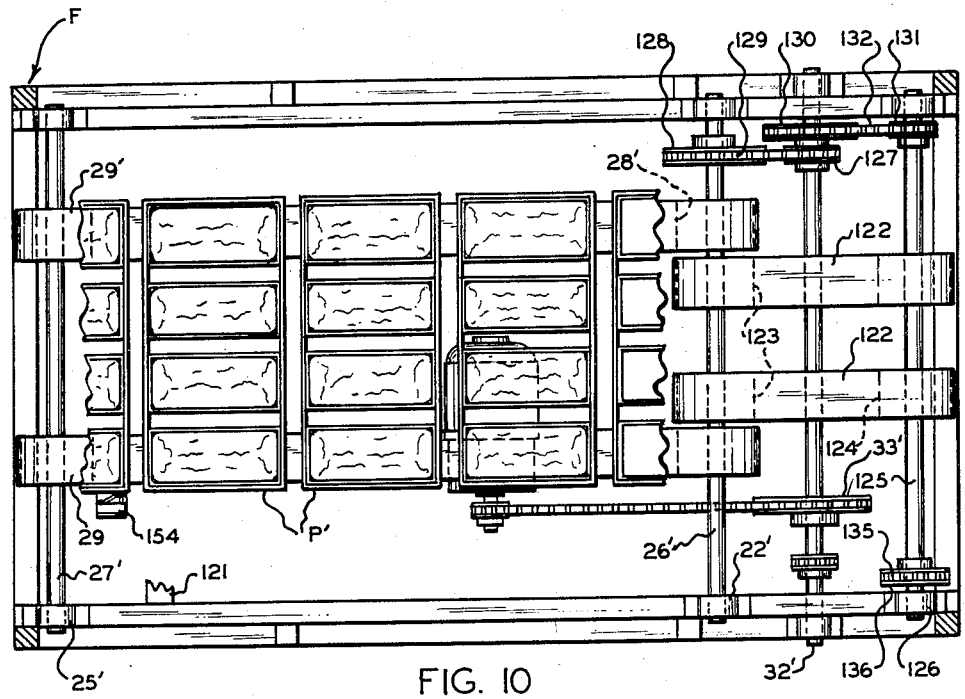
FIGURE 10 is a top plan view thereof taken on the line 10—10 of FIGURE 9.

Pan sets of bread are delivered in any conventional manner, and usually by a suitable conveyor, to the conveyor C which passes them under the member 76. The blast of air from boot 76 on the upper surface of the bread loaves tends to loosen the loaves in the pans but does not assist in raising the loaves from the pans. As shown particularly in FIGURES 7 and 8, the rails 23 include straps 107 for rods 108 which pivotally receive the journals 109a of arms 109 including collars 111, and torsion springs 112 being connected between the journals 109a and collars 111 to normally urge the arms 109 to the diagrammatic line position shown at b in FIGURE 7. Secured on the arms 109 are metal tubes 113 which have downwardly open air jet openings 114 provided therein, as shown in FIGURE 7, which blast air between the ends of the loaves and the pan in a manner so that air under pressure accumulating under the bread loaves B tend to move them upwardly at the very time that suction members 63 are first in sealed engagement with the upper surfaces of the bread loaves in the manner indicated in FIGURE 6 to assist the movement of the bread loaves from the pans to the suction cups 63. The tubes 113, which include plugged divergent portions 113a, are connected by means of flexible hoses 115 to a manifold pipe 116 which is intermittently supplied through a normally closed, solenoid actuated, shutoff valve 117 of conventional design with air under pressures in the 50 to 100 p.s.i. range from a line 118 connected to a suitable source of air under pressure such as a compressor in the bakery or the like in which the machine is operating. The valve 117 which may be an Asco spring returned solenoid valve similar to those shown in Patent 2,936,611, is closed except when its solenoid is energized by a conventional microswitch 119 supported by rails 120 and having its normally raised spring returned arm 119a in depressed position, as shown in FIGURE 8. Thus, during the time that arm 119a is depressed by the pans of the pan sets P and arms 109 and the tubes 113 carried thereby are spread by the pans of the pan sets P in the manner indicated in FIGURE 7, air will be delivered through the valve 117 to the openings 114. However, when the pans of pan set P have passed beyond the arm 119a, it will be spring returned to raised position, as shown in FIGURE 1, by the spring incorporated with the conventional limit switch 119 and deenergized valve 117 will close off the source of air pressure. The combined suction exerted by bellows members 63 when they have fully sealed to the undulant upper surface of the bread loaves and the lifting pressure obtained with jet tubes 113 readily disengage the loaves from the pans and the loaves are conveyed along with the pans by the suction conveyor S and gradually separated from them, as indicated in FIGURE 1. The surface speed of conveyors S, C, and D is the same. In order for the suction members 63 to be of value, they must seal to the highly irregular surfaces without the bottom edge rolling under in a manner to leave an air space, and the reinforced lip edge 65, as well as the resilience of the members 63, as determined by the softness of the rubber and wall thickness thereof, is highly critical to the success of the separation.

In operation, pan sets containing baked bread are delivered to the conveyor C and a blast of air from boot 76 tends to loosen the loaves in the pans. Just before the pan set reaches the arm 119a of limit switch 119 the spacing between the suction conveyor S and conveyor C is such that the bellows members 63 engage and are displaced by the irregular upper surface of the loaves. The substantially abutting bellows members 63 tend to seek a position (see FIGURE 6) on the irregular upper surface of the loaves such that the flange or lip edge 65 engages the surface of the loaves around its periphery, prior to the time that switch arm 119a is depressed by the leading pan in the pan set P. At the time that switch arm 119a is depressed and normally closed valve 117 is opened to deliver a blast of air to the ends of the pan through the jet openings 114 in tubes 113, the bellows members 63, which are in sealed engagement with the loaves B in the pans, are under the vacuum box 54 and a suction force is being exerted to lift the loaves from the pans. This lifting suction is supplemented by the air blasting down between the ends of the loaves and pan and moving under the loaves. As the bread loaves B are gradually lifted from the pans, which are continued to be conveyed along the conveyor C at the same speed as the loaves are conveyed by the bellows members 63, a gradual separation occurs. Finally, at substantially the area a where the bellows members 63 in engagement with the loaf leave the vacuum box 54, the gripping pressure exerted between the slat members of the discharge conveyor D and the bellows members 63 tends to aid in the release of the bread loaves B from the suction members 63 in a uniform manner across the whole row of bellows members 63 simultaneously so that the bread loaf B is disposed transversely on the discharge conveyor D in proper alignment for further processing machinery such as slicing and packaging machines or the like.

In FIGURES 9–17 another embodiment of the invention is illustrated in which the pan sets P' are fed broadside, rather than lengthwise as previously, to the pan set conveyor generally designated C'. Where possible, primed letters and numerals have been used to identify similar parts and it is to be understood that, except for differences which will be mentioned, the second machine includes the same parts. The supporting framework F' mounts conveyor C' endless members 29' on pairs of front and rear sprockets 28' which are spaced apart a greater distance than previously. The sprockets 28' are secured on front and rear shafts 26' and 27' supported by bearings 25'. Chain guide members 24' determine the course of the upper run of conveyor C' and can be supported by cross members 121 spanning the framework F' transversely. Motor M', which has a sprocket 30' mounted on its armature shaft 30a', drives a jack shaft 32' through a chain 30b' which is trained over a sprocket 33' on the shaft 32'.

In this embodiment of the invention the conveyor C' does not extend all the way to the front of the machine and a pair of auxiliary endless conveyor members 122 of a similar nature, which are driven at a greater surface speed than either of conveyors C' or S' which are driven at the same surface speed, are trained around sprockets 123 which are secured between the sprockets 28' on the shaft 26'. At their front ends the endless belt members 122 are trained over sprockets 124 anchored on a shaft 125 carried by bearings 126. Shaft 32' drives both shafts 26' and 125, the shaft 32' mounting a sprocket 127 for driving a sprocket 128 on shaft 26' through a chain 129, and a sprocket 130 driving a sprocket 131 on shaft 125 through a chain 132.

The discharge conveyor D', which receives the separated loaves B', includes sprockets 133 on a shaft 134 mounted by bearings 134a and driven by a chain 135 from a sprocket 136 on shaft 125. A similar slot type endless conveyor assembly D', as described previously and shown particularly in FIGURE 2 may be trained around the sprockets 133 and rear guides 98' which are supported by the framework F'. At the area a', where the suction box 54' terminates, the space between the upper run of discharge conveyor D' and the suction members 63' of the suction conveyor S' is less than the height of the bread loaves being processed so that the bread loaves B' are gripped between them and transferred to the endless member surface of conveyor D' in uniformly abreast relationship. The fact that conveyor D' is traveling at a greater speed aids an aligned transfer when the loaves are broadside.

It is to be understood that the construction of the suction conveyor S' and its associated elements for applying a suction to the bellows members 63' is substantially identical with the construction previously described. In the present instance, however, the construction is such that most of the suction members 63' which are not engaged with loaves of bread will not exert a suction. Transversely slideable valve bars 137 (FIGURES 12–14) are provided in the bars 58' which are of enlarged height and have slots 137a for accommodating slide bars 137. The bellows members 63' are similarly secured to the members 58' by threaded studs 62' having openings 64' which are in alignment with openings 138 through the upper portions of bars 58' and communicate with the open bottom of suction box 54' only when the spaced apart openings 139 in bars 137 are disposed in alignment with the openings 64' and 138. The openings 139 can be arranged for three, four, or five pan pan straps and for pans of varying size. In FIGURE 13 a pair of openings 139 are shown at x and y, each of which may be registrable with opening 138 dependent on the position of slide 137. When a four pan panset is being depanned, for instance, there will be some openings 138 in a bar 58' which will not be in registry with an opening 139. Similarly securing members 58' to the chains 57' are angle members 59' and it will be seen that each bar 137 has a dependent member 140 which, when moved laterally in a manner to be described, moves the slide bar 137 accordingly to communicate certain openings 139 with the openings 138. Each transversely disposed row of suction bellows members 63' has a slide bar 137 operating above it to communicate it with the suction box 54', if the row happens to be one which will engage bread loaves.

Figure 14:
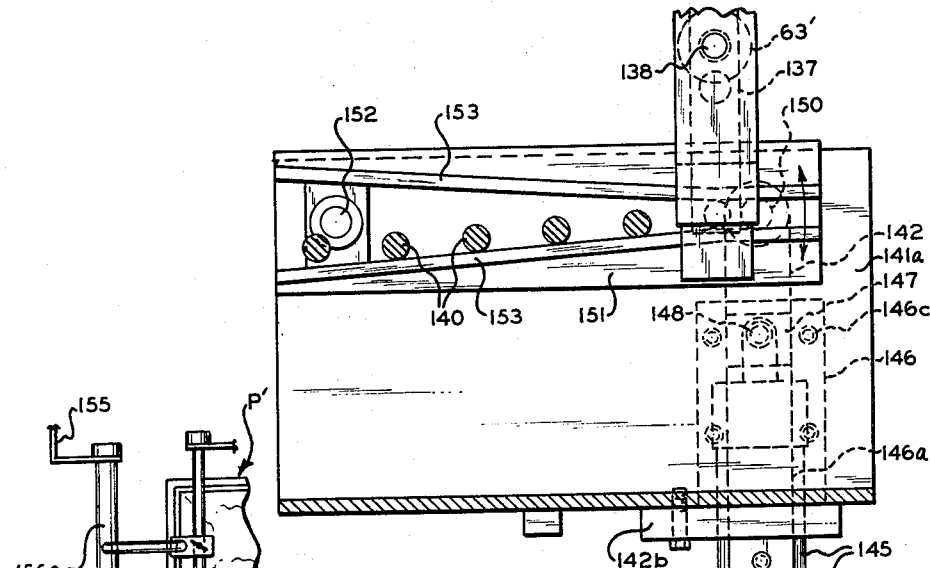
FIGURE 14 is a top plan view illustrating the mechanism disclosed in FIGURES 11–13.

Mounted to depend from the longitudinal framework members 40', which may be adjustably supported in the same manner as members 40 in the embodiment previously described, is a channel support plate 141 which on a lower web portion 141a mounts a track mounting shift bar 142 which is connected as at 143 with the piston rod 144 of a conventional, single acting, spring returned, bellows pneumatic cylinder 145. The shift bar 142 is reciprocable in a groove 146a in a guide plate 146 which is clamped to the under side of web portion 141a by a clamp plate 146b anchored by bolts 146c or the like. Depending from clamp plate 146b is a clevis 147 which is secured to the cylinder 145 as at 148 and supports it as shown. At its inner end the shift bar 142 is pivotally connected as at 150 to a track plate 151 which is pivoted as at 152 to the web portion 141a. The plate 151 carries vertically curvilinear (FIGURE 12), spaced apart, converging track plates 153 (FIGURE 14) between which the dependent lugs 140 on slide bars 137 are received as they proceed around the lower portion of suction conveyor C' sprockets 56'. A conventional microswitch 154 in the path of the pan sets P' includes an inwardly projecting, outwardly displaceable arm 155 in the path of the pan sets P' which, when moved outwardly by a pan set P, will close a circuit to operate the retract solenoid in the single acting cylinder 145 and draw shift bar 144a inwardly to swing track plate 151 inwardly about the axis 152 and, by guiding dependent lugs 140 inwardly, move slide bars 137 inwardly to align openings 139 with the openings 138. Bolted on the shift bar 142 is a stop block 142a which limits the maximum inward travel of bar 142. A latch bar 142b pivoted to the plate 141 at 142c is swingable between the block 142a and plate 141 as shown in FIGURES 12–14 to limit the maximum inward travel of bar 142. For instance, if five pan pan straps P' are being depanned, it may be desirable to swing latch bar 142b to the broken line position in FIGURE 12 in which it is supported by a member 142d and permit bar 142 to move inwardly far enough so that the x openings 139 in slides 137 line up with openings 138. This would place additional bellows members 63' on a bar 58' in communication with openings 139 in each bar 58' which are unused when four pan pan sets are being depanned. The spring incorporated in cylinder 145 returns shift bar 144a when the pan set moves beyond switch 154.

Figure 9:
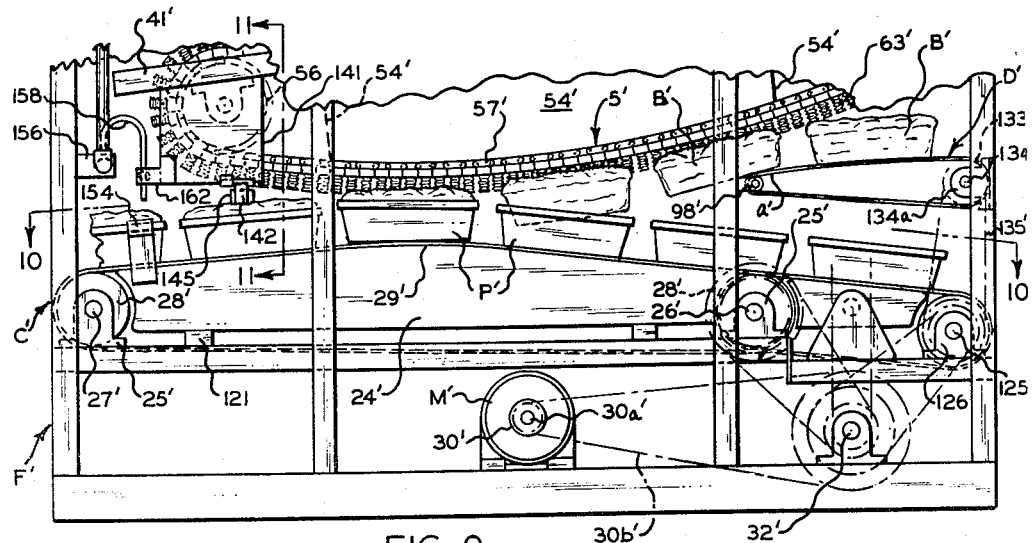
FIGURE 9 is a somewhat schematic fragmentary, side elevational view illustrating a modified embodiment of the machine in which the pan sets proceed broadside to and through the machine.
Figure 15:
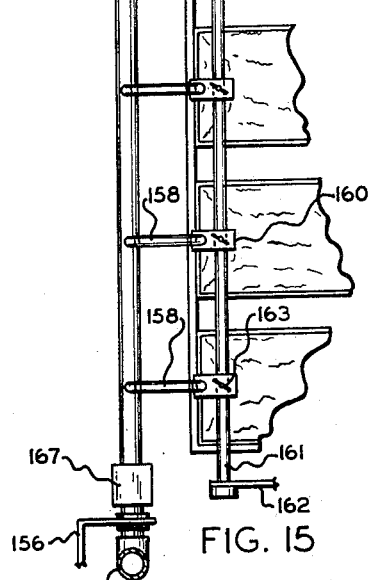
FIGURE 15 is a fragmentary, top plan view illustrating an air jet assembly for dislodging the bread in the pans.

The machine shown in FIGURES 9–17 employs air jet tubes to force jets of air between the loaves and ends of the pan, as previously. In this instance, however, inasmuch as the suction forces which can be exerted are greater, due to the selective valving assembly, the air jets are employed principally to loosen the loaves in the pans. As shown in FIGURES 9, 14 and 15, brackets 156 mounted by the framework F' support a manifold pipe 156a which is supplied by a pipe 157 with air under pressure in the nature of 50–100 p.s.i. from a suitable compressor source. Generally U-shaped, flexible jet hoses 158, communicating with the manifold pipe 156a, extend through openings 159 (FIGURE 16) in brackets 160 which are spaced on a support rod 161 in alignment with the path of travel of the abreast pans in the pan set P'. The rod 161 can be supported from the plate members 141 by brackets 162. The brackets 160 are movable to various adjusted positions along rod 161 and may be retained in position by thumb screws 163, as shown in FIGURE 15, so that the jet hoses 158 may be properly positioned, the hoses 158 being preferably formed of rubber tubing to permit some lateral adjustment.

Figure 16:
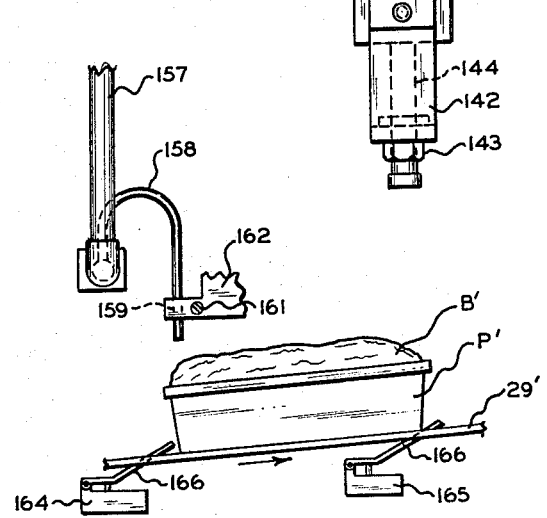
FIGURE 16 is a side elevational view further illustrating the jet tube assembly of FIGURE 15.
Figure 17:
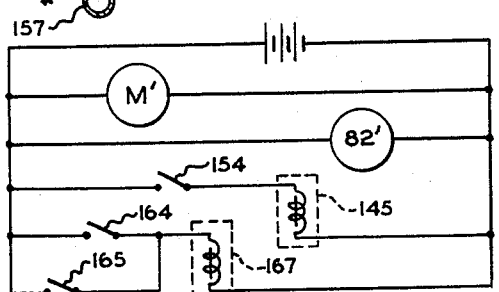
FIGURE 17 is a typical electrical control circuit for the various electrically operated elements of the second embodiment of the invention.

Mounted in the path of the pan sets P' are a pair of limit switches 164 and 165 of conventional design including arms 166 which, in normal position, are disposed as shown in FIGURE 16. These switches 164 and 165 are electrically connected in parallel (FIGURE 17) to a solenoid actuated valve 167 of the same type as valve 117. When the front end of the pans in a pan set P' depresses the first arm 166 in its path, microswitch 164 is actuated to energize and open valve 167 and the jet tubes 158 direct air blasts between the front ends of the loaves and the pans. When the pan set depresses the arm 166 of microswitch 165, valve 167, which is deenergized when the pan set leaves the arm 166 of switch 164, is again energized to open and release jets of air to the rear of the bread loaves B' in the pans and force air between the rear ends of the loaves and pans.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In depanning apparatus; generally longitudinally extending conveyor means of a width suitable for transporting baked bread loaves in pans; a suction box open along its bottom side and mounted a spaced distance above said conveyor means; an endless conveyor means above said conveyor means and having a lower run of a predetermined width extending along the lower portion of said suction box said endless conveyor means comprising means forming a belt covering the open portion of said box; said endless conveyor means having dependent resilient bellows members, individually opening through said belt to communication with said suction box for sealing to the tops of the loaves in the pans and lifting them from said pans; the bellows members being arranged in closely spaced relation relative to said loaves so that the top of each loaf is contacted by a number of said bellows members; the bellows members at their lower ends having laterally directed flanges with generally horizontal lower surfaces; means for reinforcing said laterally directed flanges to prevent them from rolling under when they engage a loaf; said endless conveyor means and conveyor means diverging so that said bread loaves can be lifted clear of the pans which proceed on said conveyor means; and means for receiving the depanned products from said endless conveyor means.

2. In depanning apparatus; generally longitudinally extending first conveyor means for transporting baked dough products in pans; a suction box mounted a spaced distance above said first conveyor means; second conveyor means above said first conveyor means and having a conveying surface traveling an endless path movable along the lower portion of said suction box; said second conveyor means having resilient bellows members, depending therefrom and open to said suction box for sealing to the tops of the dough products in the pans and lifting them from said pans; each bellows members including accordion fold portions and having a sealing lip edge with a substantially flat lower surface extending substantially horizontally outwardly relative to the lower end of a terminal fold portion; and means for receiving the depanned products from said second conveyor means.

3. In depanning apparatus; generally longitudinally extending conveyor means for transporting baked dough products in pans; a suction box mounted a spaced distance above said conveyor means; an endless conveyor means above said conveyor means and having a lower run extending along the lower portion of said suction box; said endless conveyor means having resilient bellows members, depending therefrom and open to said suction box for sealing to the tops of the dough products in the pans and lifting them from said pans; said bellows members being formed of rubber in the durometer range 40-55 and comprising accordion folds of uniform diameter and wall thickness in the range .016 to 1/16 of an inch terminating in a laterally extending lip edge with a substantially horizontal lower surface in the thickness range .020 to 1/16 of an inch in thickness; bead means for said lip edge inwardly of the edge thereof preventing its rolling under when it contacts the product; and means for receiving the depanned products from said endless conveyor means.

4. In depanning apparatus; generally longitudinally extending first conveyor means for transporting baked dough products in pans; a suction box mounted a spaced distance above said conveyor means; second conveyor means above said conveyor means and having a conveying surface traveling an endless path movable along the lower portion of said suction box; said second conveyor means having rows of resilient suction members, depending therefrom for sealing to the tops of the dough products in the pans and lifting them from said pans; actuatable slide bar means with spaced apart openings therethrough interposed between said suction members and suction box for releasably blocking communication of at least certain of said suction members with said box; and means for receiving the depanned products from said second conveyor means.

5. In depanning apparatus; frame means; generally longitudinally extending first conveyor means supported thereby for transporting baked dough products in pans; a suction box mounted a spaced distance above said first conveyor means; second conveyor means supported by said frame means above said first conveyor means and having a conveying surface traveling an endless path movable along the lower portion of said suction box; said second conveyor means having rows of resilient bellows members, extending transversely across said second conveyor means and depending therefrom for sealing to the tops of the dough products in the pans and lifting them from said pans; slide bar means with spaced apart openings therein carrried by said second conveyor means for selectively communicating only certain of said bellows members with said suction box; means mounted on said frame means movable to and from positions for actuating said slide bar means; said second conveyor means and first conveyor means diverging so that said products can be lifted clear of the pans which proceed on said first conveyor means; and means for receiving the depanned products from said second conveyor means.

6. In depending apparatus; frame means; generally longitudinally extending first conveyor means supported thereby for transporting baked dough products in pans; a suction box mounted a spaced distance above said first conveyor means; a second conveyor supported by said frame means above said first conveyor means and having a conveying surface traveling an endless path movable along the lower portion of said suction box; said second conveyor comprising side chains connected by side by side slats, each having a transversely extending row of transversely spaced resilient bellows members, depending therefrom in line with openings through each slat for sealing to the tops of the dough products in the pans and lifting them from said pans; each of said slats also slidably receiving a transversely shiftable valve slide with openings therein spaced to register with said openings in the slat when the slide is in an inner position; dependent members mounted by said valve slides; track means, mounted to be shiftable on said frame means inwardly and outwardly, receiving the dependent members on the slides as said slats travel toward the suction box and moving said slides inwardly when said track means is shifted inwardly; means for shifting said track means inwardly and outwardly; and means for receiving the depanned products from said second conveyor means.

7. The combination defined in claim 6 in which said track means is pivotally mounted; said means for shifting the track means includes a shift bar pivoted thereto; and pivotally mounted latch means is movable into the path of said shift bar for varying the extent of inward movement of said shift bar and thereby said track means to align different openings in said slides with the openings in said slats.

8. In apparatus for handling bakery products; first conveyor means for transporting bakery products; suction box means having opening means at the lower end thereof mounted a spaced distance above said conveyor means; second conveyor means mounted above said first conveyor means and having a conveying surface traveling an endless path movable along the lower end of said suction box means; said second conveyor means having a plurality of resilient, hollow suction members, depending therefrom and open to said suction box means, for sealing to the tops of the bakery products and raising them from said first conveyor means; the suction members including tubular, accordion fold bellows portions and having sealing lips at their lower ends with perimetral edge portions having substantially flat lower surfaces projecting substantially laterally beyond the portions of the suction members to which they join; and means for receiving the raised bakery products from said second conveyor means.

9. The combination defined in claim 8 in which said lips are configured to prevent the said edge portions from rolling under when they engage bakery products.

10. The combination defined in claim 8 in which said suction members are formed of rubber in the durometer range 40-55.

11. The combination defined in claim 8 in which said suction members are mounted in substantially abutting relation substantially in rows in which the suction members are staggered so that a suction member in one row is received substantially between a pair of suction members in another row, and said perimetral edge portions are of substantially uniform thickness.

12. In apparatus for handling bakery products; conveyor means for transporting bakery products; suction box means mounted a spaced distance above said conveyor means; a plurality of resilient, hollow suction members opening individually to said suction box means; the suction members including tubular, accordion fold bellows portions and having sealing lips at their lower ends with perimetral edge portions having substantially flat lower surfaces projecting substantially laterally beyond the portions of the suction members to which they join; said conveyor means and suction members being movable relatively vertically to separate the bakery products from the conveyor means; and means for receiving the separated products from said suction members.

13. The combination defined in claim 12 in which said suction members are mounted on upper conveyor means traveling at a spaced distance above said conveyor means and divergently thereto, and reinforcing bead means are provided on said lips at a spaced distance from the perimetral edges thereof to prevent the lips from rolling under when they engage bakery products.

14. In apparatus for handling bakery products; conveyor means for transporting bakery products; suction box means mounted a spaced distance above said conveyor means; a plurality of resilient, hollow dependent members opening individually to said suction box means; the dependent members comprising tubular portions with lower sealing lips having perimetral edge portions with substantially flat lower surfaces projecting generally laterally beyond the portions of the suction members to which they join; bead means joined with the upper portion of said lips at a spaced distance inwardly from the perimetral edges thereof preventing the lips from rolling under when they contact a product; said conveyor means and dependent members being movable relatively vertically to separate the bakery products from the conveyor means; and means for receiving the separated products from said dependent members.

References Cited by the Examiner
UNITED STATES PATENTS

| | | | |
|---|---|---|---|
| 2,485,040 | 10/49 | Cupo | 214—309 X |
| 2,758,731 | 8/56 | Davis | 214—309 |
| 2,798,757 | 7/57 | Jackson | 294—64 |
| 2,812,079 | 11/57 | Carnine et al. | 198—180 X |
| 2,903,290 | 9/59 | Morris et al. | 214—309 X |
| 2,927,707 | 3/60 | Reed et al. | 214—309 |
| 2,969,869 | 1/61 | Klingler | 198—180 |
| 2,975,920 | 3/61 | Reed et al. | 214—309 |
| 3,057,497 | 10/62 | Stadelman | 214—309 |
| 3,066,812 | 12/62 | Stadelman | 214—309 |

HUGO O. SCHULZ, *Primary Examiner.*

GERALD M. FORLENZA, *Examiner.*

UNITED STATES PATENT OFFICE
CERTIFICATE OF CORRECTION

Patent No. 3,170,581 February 23, 1965

Hiram E. Temple

It is hereby certified that error appears in the above numbered patent requiring correction and that the said Letters Patent should read as corrected below.

Column 9, line 69, for "In depending apparatus" read -- In depanning apparatus --.

Signed and sealed this 10th day of August 1965.

(SEAL)
Attest:

ERNEST W. SWIDER
Attesting Officer

EDWARD J. BRENNER
Commissioner of Patents